United States Patent
Kelder et al.

(10) Patent No.: US 10,567,099 B2
(45) Date of Patent: Feb. 18, 2020

(54) RECEIVE PATH QUALITY INFORMATION

(71) Applicant: NXP B.V., Eindhoven (NL)

(72) Inventors: Hendrik Jan Kelder, Eindhoven (NL); Christian Kessel, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/843,388

(22) Filed: Dec. 15, 2017

(65) Prior Publication Data

US 2018/0183536 A1  Jun. 28, 2018

(30) Foreign Application Priority Data

Dec. 22, 2016 (EP) .................................. 16206222

(51) Int. Cl.
| | | |
|---|---|---|
| *H04H 60/27* | (2008.01) | |
| *G10L 25/69* | (2013.01) | |
| *G11B 20/10* | (2006.01) | |
| *H04B 1/00* | (2006.01) | |

(Continued)

(52) U.S. Cl.
CPC ............. *H04H 60/27* (2013.01); *G10L 25/69* (2013.01); *G11B 20/10527* (2013.01); *H04B 1/005* (2013.01); *H04H 40/18* (2013.01); *H04H 60/12* (2013.01)

(58) Field of Classification Search
CPC ........ H04H 20/20; H04H 20/22; H04H 20/24; H04H 2201/60; H04L 1/02; H04L 1/20; H04L 1/201; H04L 1/22; H04L 49/9005; H04L 49/9021; H04B 1/1027;

(Continued)

(56) References Cited

U.S. PATENT DOCUMENTS 5,163,132 A * 11/1992 Dulac .................. G06F 3/0601
710/53
5,940,444 A   8/1999 Jenkin et al.
6,378,101 B1  4/2002 Sinha et al.
(Continued)

FOREIGN PATENT DOCUMENTS

| CA | 2 415 424 A1 | 1/2003 |
|---|---|---|
| DE | 10 2005 041 653 A1 | 3/2007 |
| EP | 3 089 385 A1 | 11/2016 |

OTHER PUBLICATIONS

Notice of Allowance for U.S. Appl. No. 15/849,680, 8 pgs, dated Aug. 15, 2019.

(Continued)

*Primary Examiner* — Sonny Trinh

(74) *Attorney, Agent, or Firm* — Rajeev Madnawat

(57) ABSTRACT

A method and apparatus are provided. The apparatus comprises an input for receiving a plurality of data streams carrying misaligned common content. The apparatus further comprises a plurality of buffers configured to delay one or more of the data streams to align the common content, each buffer for storing data blocks of a respective one of the plurality of data streams. The apparatus comprises an output for selecting a data block from the plurality of buffers to form a next data block in an output packet stream comprising the common content. Each data block is stored in a respective buffer along with quality information corresponding to said data block and selecting a data block from the plurality of buffers is carried out in dependence on the quality information.

15 Claims, 8 Drawing Sheets

(51) Int. Cl.
*H04H 40/18* (2008.01)
*H04H 60/12* (2008.01)

(58) Field of Classification Search
CPC .... G06F 13/287; G06F 13/34; G06F 13/4059; G06F 13/4204
See application file for complete search history.

(56) References Cited

U.S. PATENT DOCUMENTS

| | | | |
|---|---|---|---|
| 6,434,606 B1* | 8/2002 | Borella | H04J 3/0632 709/214 |
| 6,526,495 B1* | 2/2003 | Sevalia | G06F 5/065 711/173 |
| 6,851,083 B1 | 2/2005 | Hagenauer et al. | |
| 2002/0046307 A1* | 4/2002 | Treggiden | G06F 5/065 710/52 |
| 2006/0271989 A1* | 11/2006 | Glaser | H04H 20/28 725/111 |
| 2008/0032663 A1* | 2/2008 | Doyle | H04H 20/106 455/345 |
| 2008/0139109 A1* | 6/2008 | Ewertz | H04H 20/12 455/3.01 |
| 2010/0271944 A1 | 10/2010 | Michaelis et al. | |
| 2011/0243155 A1* | 10/2011 | Gondo | H04L 1/0045 370/474 |
| 2012/0331190 A1* | 12/2012 | Nakagawa | G06F 13/1673 710/57 |
| 2013/0343576 A1* | 12/2013 | Pahuja | H04H 40/36 381/119 |
| 2014/0229954 A1* | 8/2014 | Yang | G06F 3/06 718/102 |
| 2014/0268401 A1* | 9/2014 | Zhang | G06F 12/082 360/65 |
| 2015/0079916 A1* | 3/2015 | Wolf | H04B 1/1027 455/135 |
| 2016/0119066 A1 | 4/2016 | Oldewurtel et al. | |
| 2016/0241350 A1 | 8/2016 | Nekhamkin et al. | |
| 2017/0195243 A1* | 7/2017 | Bohn | H04L 12/1868 |
| 2018/0183550 A1* | 6/2018 | Kessel | H04H 20/20 |

OTHER PUBLICATIONS

Wiese, D. "Source related error concealment techniques for Digital Audio Broadcasting (DAB) considering the listeners perception", IEEE ASSP Workshop on Applications of Signal Processing to Audio and Acoustics, Final Program and Paper Summaries, 2 pgs. (Oct. 1991).

Sanneck, H. et al. "A new technique for audio packet loss concealment", IEEE Gobal Telecommunications Conference Proceedings of GLOBECOM'96, pp. 48-52 (Nov. 1996).

Wah, B.W. et al. "A survey of error-concealment schemes for real-time audio and video transmissions over the Internet", IEEE Proceedings International Symposium on Multimedia Software Engineering, 8 pgs. (Dec. 2000).

Notice of Allowance for U.S. Appl. No. 15/849,680 11 pgs, dated May 7, 2019.

* cited by examiner

RECEIVE PATH QUALITY INFORMATION

CROSS-REFERENCE TO RELATED APPLICATIONS

This application claims the priority under 35 U.S.C. § 119 of European Patent application no. 16206222.8, filed on Dec. 22, 2016, the contents of which are incorporated by reference herein.

FIELD

This invention relates to the processing and storing of broadcast data in a multiple source receiver and in particular but not exclusively to the maintenance of quality information associated with stored audio data from multiple sources in a multiple source audio receiver.

BACKGROUND

Some modern broadcast receiver devices are designed to support multiple audio inputs from different broadcast domains. For example end user content (such as a radio show) may be received via audio streams from domains such as frequency modulation broadcasting (FM), digital audio broadcasting (DAB) and/or Internet radio. The transmit paths of these audio stream may have varying processing delays which result in streams that are misaligned in time. Initial processing at the receiver may misalign the audio streams further.

It may be a requirement for the broadcast receiver to switch from one audio stream or input to another, for example an input may be lost when the receiver moves out of range of the input's source. Due to the misalignment, the transition may not be seamless which degrades user experience. For example when switching from a transmit path with a short processing delay to a transmit path with a long processing delay, data may not yet be available on the high processing delay path. A potential approach to address this is the buffering of the received audio streams in order to realign the incoming data. However some information associated with a path may be lost when buffering.

Embodiments of the present application may be concerned with the quality of data buffered in a multi-source receiver.

SUMMARY

According to a first aspect, there is provided a method comprising: receiving a plurality of data streams carrying misaligned common content; delaying one or more of the data streams to align the common content by storing the plurality of data streams in a plurality of buffers, each buffer storing data blocks of a respective one of the plurality of data streams; and forming an output packet stream comprising the common content by selecting a data block from the plurality of buffers to form a next data block in the output packet stream; wherein the step of each buffer storing data blocks of a respective one of the plurality of data streams further comprises storing quality information corresponding to each data block and selecting a data block from the plurality of buffers is carried out in dependence on the corresponding quality information.

Forming the output packet stream may further comprise selecting a number of data blocks from the plurality of buffers to form the number of next data blocks in the output packet stream. The method may further comprise: determining whether any of the next data blocks are selected from a first buffer of the plurality of buffers and, if not, using a receive path associated with that first buffer for another application. Using the receive path associated with the first buffer for another application may further comprise detuning the receive path from the first data stream. Selecting a data block from the plurality of buffers in dependence on the corresponding quality information may further comprise selecting a data block if the quality information corresponding to that data block indicates that the data block is of sufficient quality to be rendered to the output.

Forming the output stream comprising the common content may further comprise: selecting one of the plurality of data streams to be a default data stream; and selecting one or more first data blocks from a first delay buffer associated with the default data stream when the quality information associated with the first data blocks indicate that the first data blocks are of sufficient quality to be rendered; selecting one or more second data blocks from a second delay buffer associated with a further one of the plurality of data streams when the quality information associated with the second data blocks indicate that second data blocks are of sufficient quality to be rendered and quality information associated with third data blocks in the first delay buffer indicate that the third data blocks are of insufficient quality to be rendered, wherein the common content in the second and third data blocks correspond; and when a number of successive data blocks are selected from one of the first delay buffer and the second delay buffer, make a receive path associated with the other of the first delay buffer and the second delay buffer available to another application.

The default data stream may be selected as being associated with higher average quality information than that of the further one of the plurality of data streams. Each respective buffer may comprise a data buffer portion for storing a plurality of data blocks of a respective data stream and an associated quality buffer portion for storing quality information corresponding to each of the plurality of data blocks. The step of selecting buffered data blocks may further comprise: prioritising selecting buffered data blocks from a delay buffer corresponding to a data stream that is subject to less delay over selecting buffered data blocks from a delay buffer corresponding to a data stream that is subject to more delay.

The delay may be at least one of a transmit path and processing delay. Each buffer may be a first in first out FIFO and read pointers for each of the buffers are synchronised. The quality information corresponding to each data block may correspond to a quality experienced by a receive path at the time of reception of each data block.

According to a second aspect, there is provided an apparatus comprising: an input for receiving a plurality of data streams carrying misaligned common content; a plurality of buffers configured to delay one or more of the data streams to align the common content, each buffer for storing data blocks of a respective one of the plurality of data streams; and an output for selecting a data block from the plurality of buffers to form a next data block in an output packet stream comprising the common content; wherein each data block is stored in a respective buffer along with quality information corresponding to said data block and selecting a data block from the plurality of buffers is carried out in dependence on the quality information.

The output may be further configured to select a number of data blocks from the plurality of buffers to form the number of next data blocks in the output packet stream. The apparatus may be further configured to determine whether any of the next data blocks are selected from a first buffer of the plurality of buffers and, if not, using a receive path associated with that first buffer for another application. Using the receive path associated with the first buffer for another application may further comprise detuning the receive path from the first data stream. The output may be further configured to select a data block from the plurality of buffers if the quality information corresponding to that data block indicates that the data block is of sufficient quality to be rendered to the output.

The output may be configured to: select one of the plurality of data streams to be a default data stream; and select one or more first data blocks from a first delay buffer associated with the default data stream when the quality information associated with the first data blocks indicate that the first data blocks are of sufficient quality to be rendered; select one or more second data blocks from a second delay buffer associated with a further one of the plurality of data streams when the quality information associated with the second data blocks indicate that second data blocks are of sufficient quality to be rendered and quality information associated with third data blocks in the first delay buffer indicate that the third data blocks are of insufficient quality to be rendered, wherein the common content in the second and third data blocks correspond; and when a number of successive data blocks are selected from one of the first delay buffer and the second delay buffer, make a receive path associated with the other of the first delay buffer and the second delay buffer available to another application.

The default data stream may be selected as being associated with higher average quality information than that of the further one of the plurality of data streams. Each respective buffer may comprise a data buffer portion for storing a plurality of data blocks of a respective data stream and an associated quality buffer portion for storing quality information corresponding to each of the plurality of data blocks. The output may be configured to prioritise selecting buffered data blocks from a delay buffer corresponding to a data stream that is subject to less delay over selecting buffered data blocks from a delay buffer corresponding to a data stream that is subject to more delay. The delay may be at least one of a transmit path and processing delay. Each buffer may be a first in first out FIFO and read pointers for each of the buffers are synchronised. The quality information corresponding to each data block may correspond to a quality experienced by a receive path at the time of reception of each data block.

FIGURES

Embodiments will be described, by way of example only, with reference to the drawings, in which.

It will be appreciated that for features that span more than one drawing like reference numerals indicate the like feature.

DETAILED DESCRIPTION

Figure 1:
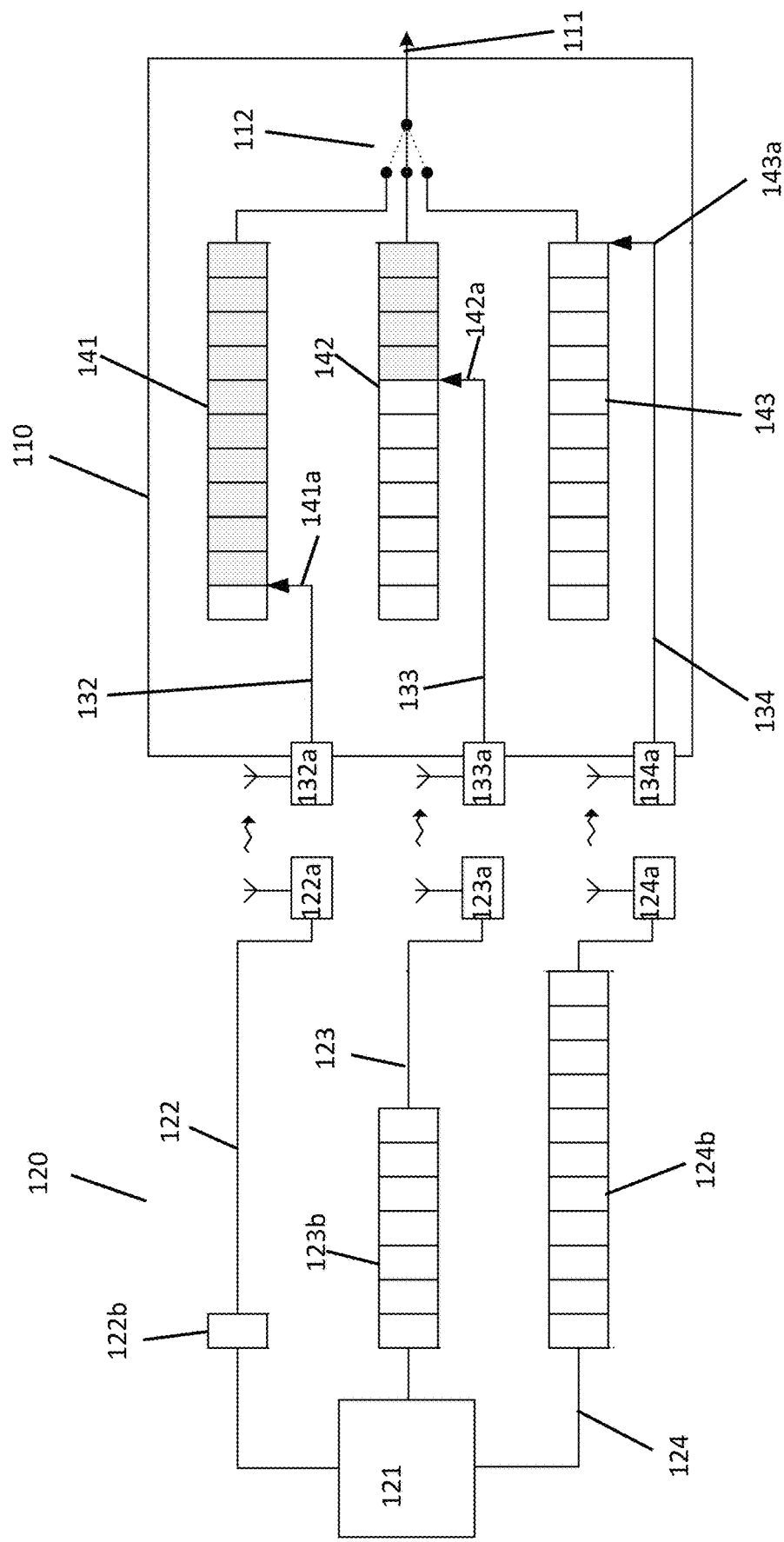
FIG. 1 is an example schematic of a multiple source receiver.

The following embodiments may be described with reference to packet streams carrying audio data. This has been done for ease of explanation only and it will be appreciated that at least some embodiments may be applicable to other types of broadcast or streaming data, for example video data. It will be appreciated that here the term broadcast is intended to cover packet streams broadcast from one entity to multiple other entities as well as packet stream broadcast from one entity to a specific few or a particular one other entity. For example, the broadcast packet stream may be a unicast stream.

In multi-source transceiver systems, content may be transmitted via a plurality of paths corresponding to different transmission technologies. The content may be commonly generated at a common data source but may be processed and transmitted via different transmit paths. Examples of such transmit technologies may include frequency modulation (FM), digital audio broadcasting (DAB), internet broadcasting and/or others. A multi-source receiving device may be able to receive transmissions of the content along two or more of these paths however, due to processing delays of the respective paths, the commonly generated content carried on the transmission paths may become misaligned.

The receiving device may rely on the content from a first transmission paths to be rendered and provided to a user. If the first transmission path becomes unavailable, the receiving device may switch to provide the content from the second transmission path instead. For example, a user may be listening to the content received via an FM transmission while driving, when they drive into a tunnel and lose their FM signal. The receiving device may then switch to a second transmission, for example a DAB transmission path, to continue to provide the content to the user. Due to the differences in a processing time on the first and second paths, the content received and the first path and the content received on the second path may be misaligned. In order for the switch between the first and second path to be less noticeable, the content on the respective paths needs to be aligned. The receiving device may do this by delaying the content from the path that is ahead in time until at least a portion of the content has been received from the first and second paths. The receiving device can introduce this delay by buffering the received data from the first and second paths.

The receive quality may be determined for each transmission/receive path of the receiving device. The quality may for example correspond to channel conditions of the transmit/receive path. The quality may correspond to the current receive quality experienced on a transmit/receive path at the receiving device, however because the data is buffered, the currently experienced quality may not be valid. For example, even though a receiver of the receiving device may be currently experiencing good quality, the buffered data may have been received at a time at which the receiver was experiencing a lower quality. A decision to switch between receive paths based on a current measurement of quality may not be entirely accurate.

FIG. 1 is an example of a transceiver system that preserves quality information associated with buffered data. This may assist in selecting a receive path for providing data to be rendered.

FIG. 1 shows an example of a multi-source broadcast system 100 comprising a receiving device 110 and a transmitting device 120. The transmitting device 120 comprises a common data source 121 and three transmit paths 122, 123 and 124. The common data source 121 may generate content to be transmitted via respective paths 122, 123 and 124. Each transmit path comprises a transmitter 122a, 123a and 124a and a processing delay 122b, 123b and 124b associated with that path.

Each of the transmit paths 122, 123 and 124 may transmit the content according to a different transmission technology. For example the first path 122 may transmit the content based on an analogue technology such as frequency modulation (FM); the second path 123 may transmit the content according to a digital transmit technology such as digital audio broadcasting (DAB); and the third transmit path 124 may transmit the content according to technology such as an internet broadcast.

Each of the three transmit technologies may be associated with a delay that is caused by the different processing that the content undergoes before it can be transmitted by the respective transmitters 122a, 123a and 124a. For example, the processing on the first path 122 may cause the content to experience a first delay 122b, the processing on the second path 123 may cause the content to experience a second delay 123b and the processing on the third path 124 may cause the content to experience a third delay 124b. In the above examples, the paths have been exemplified as being FM, DAB and internet broadcast. Accordingly, the first delay 122b associated with FM is relatively short, for example a time A (depicted as one delay block). The second delay 123b associated with DAB is longer, for example a time B (depicted as seven delay blocks). The third delay 124b, associated with internet broadcast, may experience the longest delays, for example a time period C (depicted with eleven delay blocks).

It will be appreciated that the number of delay blocks is by way of example only and functions to indicate the differing delays experienced by content generated by a common data source 121 along each path. Accordingly, corresponding content on each path reaches the respective transmitter 122a, 123a and 124a at differing times and the content along the three paths is misaligned with respect to time. For example, the content on the second path 123 may be misaligned by a time (B-A) with respect to the content on the first path 122. The content on the third path 124 may be misaligned by a time (C-A) with respect to the content on the first path 122 and by a time (C-B) with respect to the content on the second path 123.

The receiving device 110 comprises three receive paths 132, 133 and 134, each comprising a respective receiver 132a, 133a, 134a and delay buffer 142, 143 and 144. Data streams comprising the content received on each of the paths 132, 133 and 134 are stored in the respective delay buffer 141, 142 and 143 for that path. An output of the delay buffers is coupled to an output 111 via a selection mechanism 112. The output 111 provides data from a selected delay buffer to be rendered and to provide to a user, for example via a speaker. The rendering may include decoding and further processing to output the content.

In this example each of the receiver paths 132, 133 and 134 are configured to receive a data stream comprising the commonly generated content and transmitted according to a different transmission technology. For example, the first receive path 132 may be configured to receive the content transmitted in accordance with FM; the second receive path 133 may be configured to receive the content transmitted in accordance with DAB; and the third receive path 134 may be configured to receive the content transmitted in accordance with internet broadcast.

For example, the first receive path 132 may be configured to receive the content transmitted from the first transmit path 122; the second receive path 133 may be configured to receive the content transmitted from the second transmit path 123; and the third receive path 134 may be configured to receive the user content transmitted from the third transmit path 124.

The respective receivers 132a, 133a and 134a receive respective data streams comprising the content. The content in the data streams may be misaligned due, at least in part, to the delays A, B and C introduced by the relative processing paths 122, 123 and 124. In order to realign the content, the receiving device 110 may delay or buffer the respective data streams until at least some corresponding content has been received on each stream. For example, the streams may be buffered until at least a portion of the user content is received at each receive path. In general, the delay buffers may delay the availability of data in the buffers to the output for a period corresponding to the delay between the fastest and slowest transmission path. In this manner, data only becomes available to the output, when corresponding user content has been receiver on all the paths. At this point in time onwards, the data in the buffers (comprising the content) may be made available to the output 111 for rendering.

Delaying the respective data streams may comprise storing received data in a respective data buffer. In the example of FIG. 1, the first path 122, 132 has the shortest processing delay and is the first to start receiving data. The received data stream on the first path is written to the first delay buffer 141. A write pointer 141a of the first delay buffer 141 indicates an amount of data that has been written to the first buffer. The delay between the first and second paths is (B-A) and so the first path 132 receives data for a period of (B-A) before the second path starts receiving data. When data is received on the second path 133, it is written into the second delay buffer 142. A write pointer 142a indicated the amount of data that has been written to the second buffer.

The delay between the first and third paths is (C-A) and so the first path 132 receives data for a period of (C-A) before the third path starts receiving data. The delay between the second and third paths is (C-B) and so the second path 133 receives data for a period of (C-B) before the third path 134 starts receiving data. A write pointer 143a indicates the amount of data written to the third buffer.

FIG. 1 depicts the state of the delay buffers 141, 142 and 143 when a first unit of a data stream comprising the content is received and stored in the third buffer 143. At this point, the first receive path 132 has been receiving the content for a time period of (C-A) and the second receive path 133 has been receiving the content for a time period of (C-B) and the third receive path 134 has just received its first unit of the content. At this point at least a portion of the content is available in all three of the delay buffers 141, 142 and 143 and so the data in the delay buffers 141, 142 and 143 becomes available for selection to be provided to the output 111.

In this example it is shown that at least one data block of the data stream is buffered for the receive path experiencing the highest delay, however it will be appreciated that in other examples the data stream for this path may not be buffered at all and may be made available immediately for output. In an example, the buffers are arranged as first-in first-out (FIFO) buffers, however, it will be appreciated that the buffers may take any suitable form.

The read pointers of each buffer 141, 142 and 143 may initially point to the first unit of the content in each buffer and may be synchronised so that they are updated simultaneously regardless of which buffer is coupled to the output 111. In this manner, if the receive paths are switched between (the switching mechanism 112 couples a different buffer to the output 111) the read pointers of all the buffers point to the same position with respect to the content. It will be appreciated that the delay buffers may be of a size to cater to the maximum delay between the fastest and slowest transmit paths.

A receiver 132*a*, 133*a*, 134*a* may be configured to make a determination of a quality experienced by a receive path 132, 133, 134. This determination may be based on characteristics of the received data stream, for example a channel quality experience by the received data stream. The quality information may be provided to the selection mechanism to aid in the selection of the receive path to be coupled to the output. The quality experience by a receiver may differ over time. Thus the current measurement of quality may not correspond to a quality experience at the time buffered data was received.

Embodiments of the present application further provide quality buffers associated with each delay buffer which store an indication of quality of corresponding received data in the delay buffer. In this case a decision of which receive path to couple to the output may be made in dependence on the quality experienced by that path at the time at which the data was received.

Figure 2:
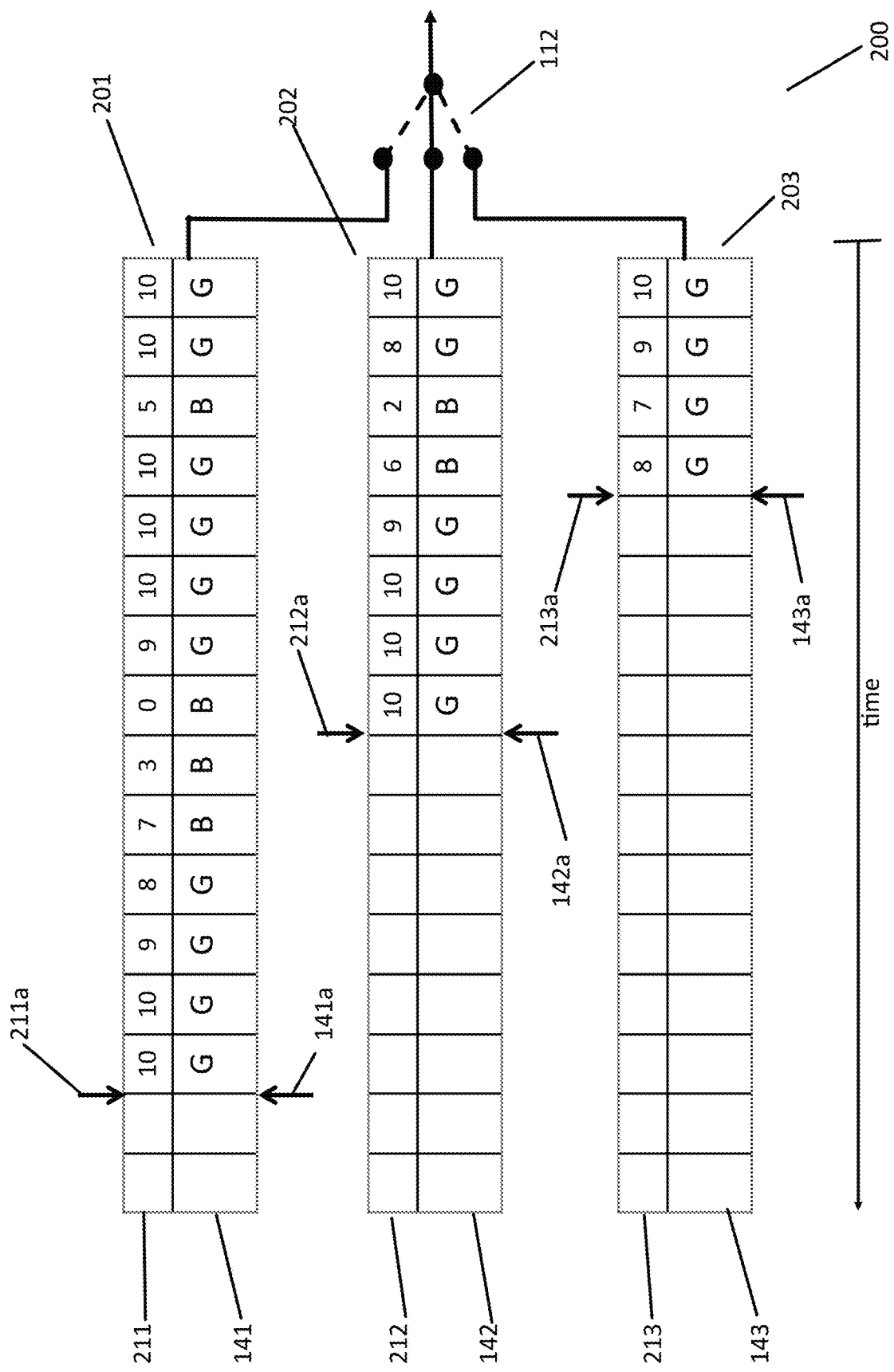
FIG. 2 shows an example of delay buffers in accordance with an example.

FIG. 2 shows an example of delay buffers in accordance with an embodiment. The delay buffers 200 comprise a first delay buffer 201 corresponding to a first receive path 132, a second delay buffer 202 corresponding to a second receive path 133 and a third delay buffer 204 corresponding to a third receive path 134. An output from each of the delay buffers is coupled to a selection mechanism 112 which provides data from a selected one of the delay buffers to an output 111.

Each of the delay buffers 201, 202, 203 comprises a data buffer portion 141, 142,143 and a quality buffer portion 211, 212, 213. For example, the first delay buffer 201 comprises a first data buffer portion 141 and a first quality buffer portion 211. The second delay buffer 202 comprises a second data buffer portion 142 and a second quality buffer portion 212. The third delay buffer 203 comprises a third data buffer portion 143 and a third quality buffer portion 213.

Each of the data buffer portions 141, 142, 143 is associated with a respective write pointer 141*a*, 142*a*, 143*a* which point to a position within the data buffer portion to be next written to with an incoming data stream on the receive path. As described in relation to FIG. 1, data is written to the respective data buffer portions when it is received by the respective receive path. The received data on the respective paths may be offset in time due to differing processing delays experienced on the transmission paths from the transmitting device. Each of the data buffer portions may further comprise a read pointer indicating data available to be read. In the example of FIG. 2, the buffers are FIFOs and the position of the read pointer is indicated as the first position in the buffer. In order to realign the data in the buffers, data is only begun to be made available when at least a portion of corresponding data is available in all the buffers. The read pointer of the buffers is synchronised so that the respective read pointers point to corresponding data even for the buffers not selected as output.

Each of the quality buffer portions 211, 212 and 213 are associated with the respective data buffer portions 141, 142, 143 of the data buffer 201, 202, 203 and store quality information corresponding to the data in the buffer. In the example of FIG. 2, each of the quality buffer portions comprise a write pointer 211*a*, 212*a*, 213*a* which indicate a position in the quality buffer portion to be written to next. Because the quality information corresponds to a data block, the write pointers of a quality buffer portion and a data buffer portion are synchronised. For example, the quality buffer portion 211 is associated with the data buffer portion 141 and stores quality information corresponding to each block of data in the data buffer portion 141. For each block of stored data, the quality information is generated at the time of the reception of a corresponding block of data and is stored as the corresponding block of data is stored.

While we have exemplified having two pointers—one to the data block portion and one to the quality information portion of a buffer, it will be appreciated that in some embodiments one pointer may be used to point to both the data block and associated quality information.

In FIG. 2, the quality information stored in the respective quality buffer portions 211, 212, 213 is indicated as having a value of 0 to 10 where 0 is the lowest quality and 10 is the highest quality available. For clarity of explanation, data blocks in the data buffer portions are indicated as G or B where G (good) indicates that a data block is of a sufficient quality to be rendered to the output and B (bad) indicates that the data block is of an insufficient quality to be rendered to the output. The receiving device may determine whether a data block is of sufficient quality (G) or insufficient quality (B) independent on the corresponding quality in the associated quality buffer portion.

In this manner, quality data for a data block may correspond to the receive quality experienced by the receiver at the time of reception of the data block. The selection mechanism 112 may select which delay buffer to provide data to the output in dependent on the quality of the data stored in the quality buffer portions.

Although the quality information has been depicted as a value between 0 and 10, it will be appreciated that this is by way of example only. In other examples, the quality information may be implemented as another indication, for example in some examples the quality information may simply be a good or bad indication if the quality is deemed to be above or below a threshold.

The available of the quality information may be used by the receiving device in various algorithms to attempt to optimise the use of the receivers and/or the quality of the output data. FIGS. 3 to 5 show examples of some of the uses of the quality information. FIG. 3 gives an example of using the information to select the highest quality data to be output. FIGS. 4 and 5 give examples where a receiver of the receive path having a delay buffer may be used for other functions when that receive path is not selected as output.

Figure 3A:
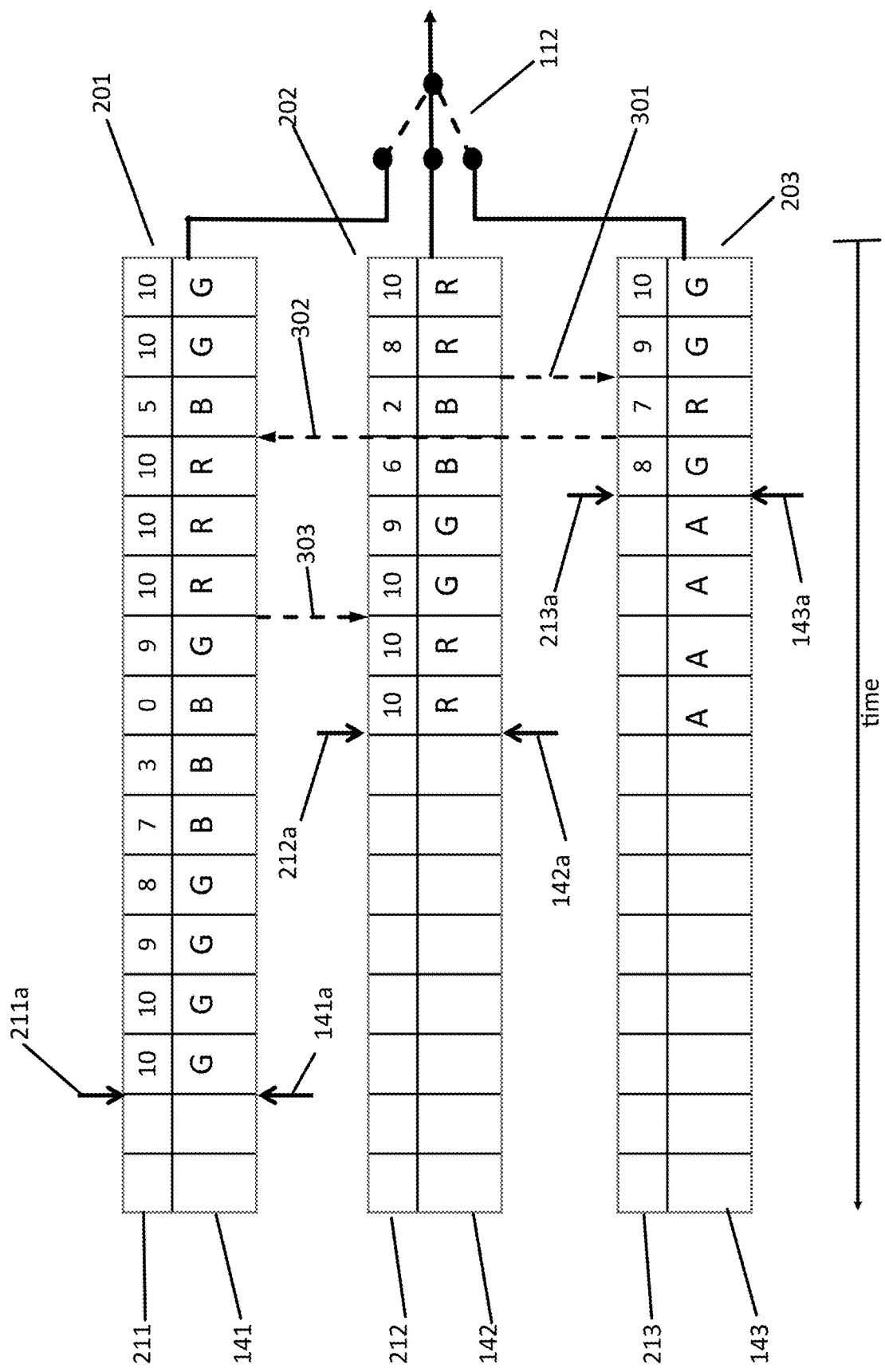
FIG. 3a shows an example of a selection method in accordance with a first embodiment.
Figure 4A:
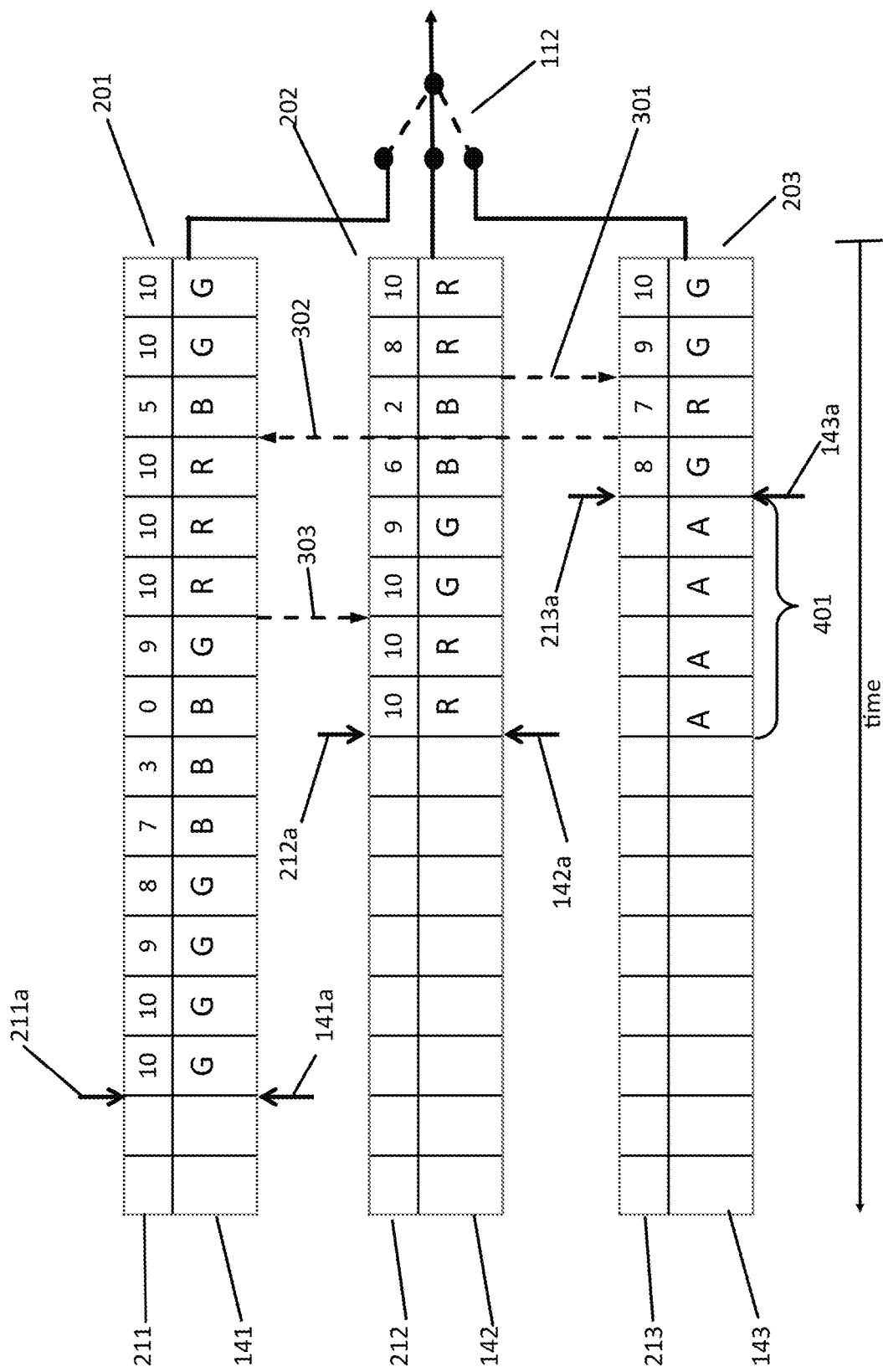
FIG. 4a shows an example of a selection method in accordance with a second embodiment.

FIG. 3*a* shows an example where the selection of the data to be provided to the output is based on the quality of the available data. FIG. 3*a* is similar to FIG. 2 with the addition of indicating which of the delays buffers 201, 202, 203 are selected for output at which time. FIG. 3*a* explicit indicates which of the data blocks stored in the buffers are rendered to the output. It will be appreciated that in operation data blocks are written to and read from the buffers continuously. FIG. 3*a* shows the state of the buffers at one time. Because the buffered data is available in the buffers, the selection mechanism may make a determination of which buffer to choose ahead of time. It will however be appreciated the in other example the selection mechanism may make the decision on a block by block basis.

At the time of FIG. 3a, 14 data blocks and associated quality information have been stored in the first delay buffer 201, 8 data blocks and associated quality information have been stored in the second delay buffer 202, and 4 data blocks and associated quality information have been stored in the third data buffer 203. It can been seen from this that, due to processing delays, the first receive path is ahead in time with respect to the second and third receive paths and as such buffers (14-8) data blocks and (14-4) data blocks to realign the data stream received on the first receive path with the data streams on the second and third receive paths. In this case, buffered data blocks and associated quality information is available for a determination of which buffer 201, 202, 203 to couple to the output at which time.

In this example, the second buffer 202 is initially selected as the output buffer. The first and second data blocks stored in the second buffer 202 have associated quality parameters of 10 and 8 respectively and are considered to be good quality and selected to be rendered to the output. The data blocks rendered to the output are marked as R.

The third data block of the second buffer 202 however is of low quality (2) and thus the selection mechanism determines that another receive path should be switched to. The third data block of the third receive path has a quality (7) higher than that of the third data block (5) of the first receive path and the third receive path is switched to for the third data block at 301.

For the fourth data block, the third data buffer 203 and first data buffer 201 both store data of sufficient quality and so the first data buffer 201 is selected as output at 302. The fourth, fifth and sixth data blocks of the first buffer 201 are all rated 10 and these are selected to be rendered to the output. The fifth data block of the first buffer has a quality of 9, while the fifth data block of the second buffer has a quality of 10 and thus, at 303, the selection is changed from the first buffer 201 to the second buffer 202. At the second buffer, the fifth and sixth data blocks are selected to be rendered to the output.

It will be appreciated, that due to the buffered data, these selections may be made ahead of time. As the data is rendered to the output new data may be buffered and the selection mechanism may make further determinations in dependence on the quality buffer portions as to which data buffer portion to select.

Figure 3B:
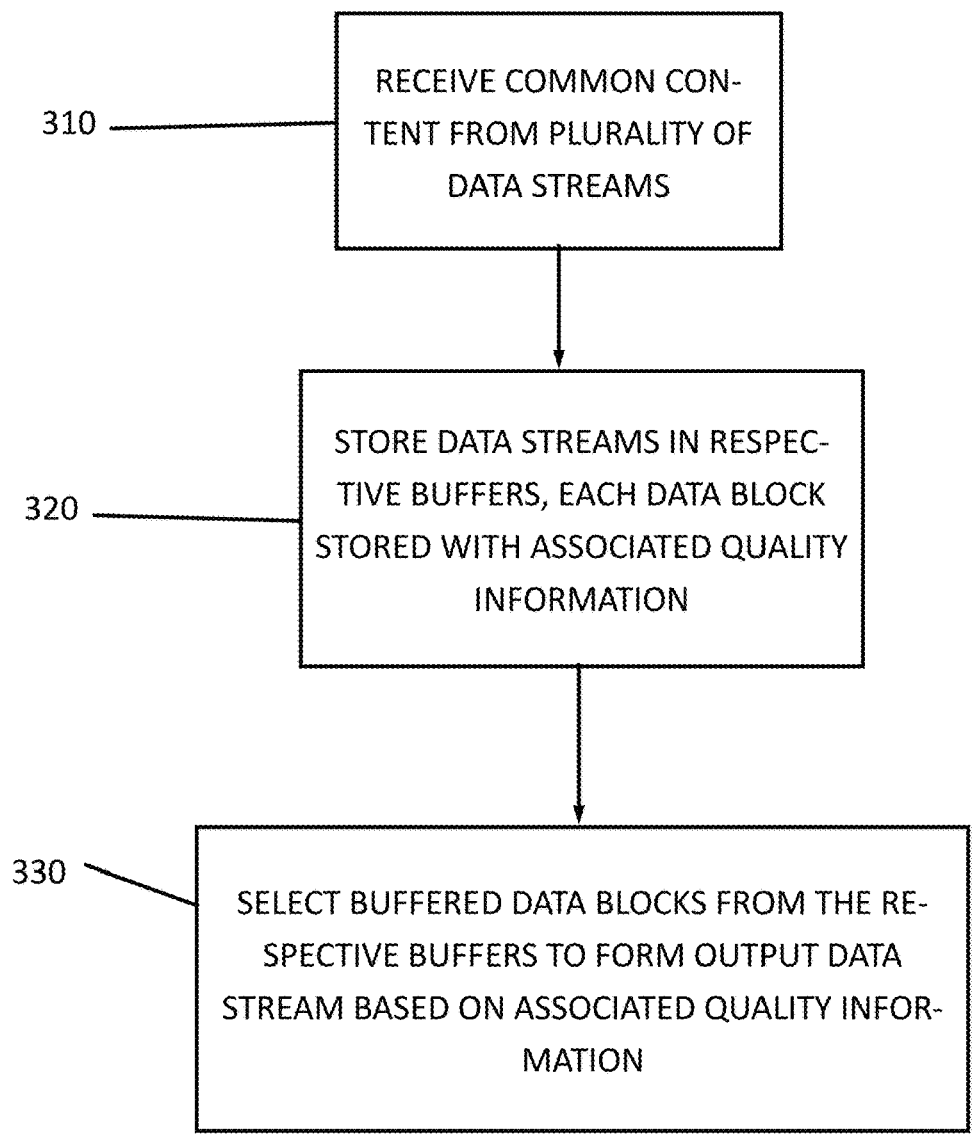
FIG. 3b is a flow diagram depicting method steps that may be carried out in accordance with a first embodiment.

FIG. 3b is a flow diagram depicting the method steps that may be associated with selecting output data blocks based on quality information associated with and stored with those blocks.

At step 310 of FIG. 3b, a plurality of data streams are received. The data streams are each made up of data blocks and comprise common content. At step 320, each data stream is stored in a respective data buffer. In addition to storing the data block of a data stream in a buffer, quality information for each of the data blocks is stored with that data block. The quality information may correspond to a quality experienced by the receive path at the time at which the associated data block is received. Buffering the data streams may further be used to align the common content carried within the streams by delaying one of more of the data streams. This delaying may comprise providing a read or output pointer for each buffer that points to a corresponding position in the common content in each buffer. The read pointers for each buffer may be synchronised such that if a buffer selection is changed, the newly selected buffer is configured to continue to output a data block corresponding to a next block of the common content.

At step 330, buffered data blocks are selected for output based on their associated quality information. This may be carried out, for example, by a selection mechanism and blocks selected from the plurality of buffers may be multiplexed to form an output packet stream carrying the common content.

The examples of FIGS. 3a and 3b have depicted selecting between the available data in the data buffers in dependence on the quality information associated therewith. It will however be appreciated that other algorithms for selecting may be implemented.

In one example, the selection mechanism may prioritise the selection order of the buffers in order of the amount of buffered data available (in other words prioritise selecting a buffer for a receive path experiencing the least delay). In the case of selecting between two buffers, a buffer buffering a packet stream experiencing the least delay of the two may be selected. This allows the buffer having a larger amount of buffered data to be selected. For example, the selection mechanism may select the first data buffer 201 over the second and third buffer 202 and 203 when data of equal quality is available and select the second data buffer 202 over the third data buffer when data of equal quality is available.

In another example, the selection mechanism may prioritise the currently selected receive path (or buffer). For example, if a next block of data in the selected buffer is of sufficient quality but of a lower quality than a corresponding block of data in another buffer, the selection mechanism may stick to the currently selected buffer for output. In another embodiment, the selection mechanism may take into account the number of sequential blocks of data of sufficient quality that are available in a buffer. For example, a buffer with a largest amount of contiguous data blocks of sufficient quality may be selected a buffer with fewer contiguous data blocks of a better quality.

In one example the selection mechanism may be configured to select an output data block or buffer so that a receive path may be used to perform other functions when it is not selected. This is shown in FIGS. 4a and 4. FIG. 4a is similar to FIG. 3a and it will be appreciated the like reference numerals refer to like features.

The data streams received on the different receive paths may comprise common content or data that may be misaligned with respect to time. This may result in some receive paths receiving the data before others. The receive paths may buffer the data until at least a portion of corresponding data (or content) is received on all the receive paths. As can be seen from FIG. 4a, this may result in some buffers storing more data than others at a given time. In the example of FIG. 4a, the first receive path may experience less of a processing delay from a transmit path and the arrival of data at the first buffer 201 may be ahead of the second and third buffers. The third receive path may experience the most delays and thus may have buffered the least data at any given time. It may be determined that the third receive path will not be selected as an output for a period of time because data may be buffered in the first and/or second buffers 201, 202 that is of sufficient quality. In this case the third receive path may be used for other purposes, for example for a background scan.

FIG. 4a shows an example of this. In FIG. 4a, the first buffer 201 and second buffer 202 have stored $5^{th}$ to $8^{th}$ data blocks of sufficient quality. Even though the $5^{th}$ to $8^{th}$ data blocks have not yet been received on the third data path, the $5^{th}$ to $8^{th}$ data blocks buffered by the first and second buffers are of sufficient quality to be output. In this case, the third data path is not selected as output for these blocks and may be used during the period 401 for other purposes. The buffer space is marked as A for available for this period as it is available for other purposes. The third data path may later be re-tuned to receive data blocks on the third transmit path when necessary.

Figure 4B:
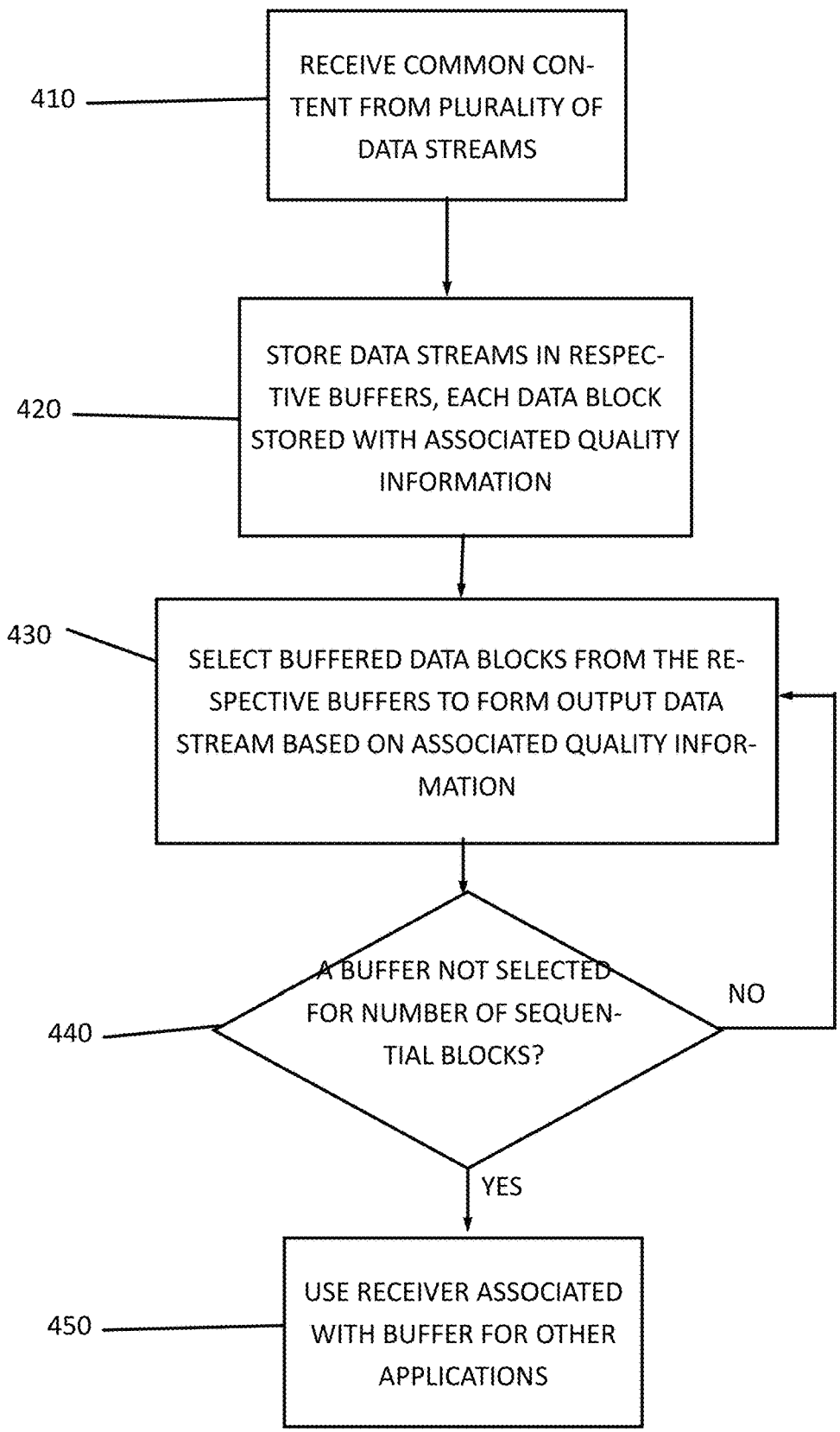
FIG. 4b is a flow diagram depicting method steps that may be carried out in accordance with a second embodiment.
Figure 5:
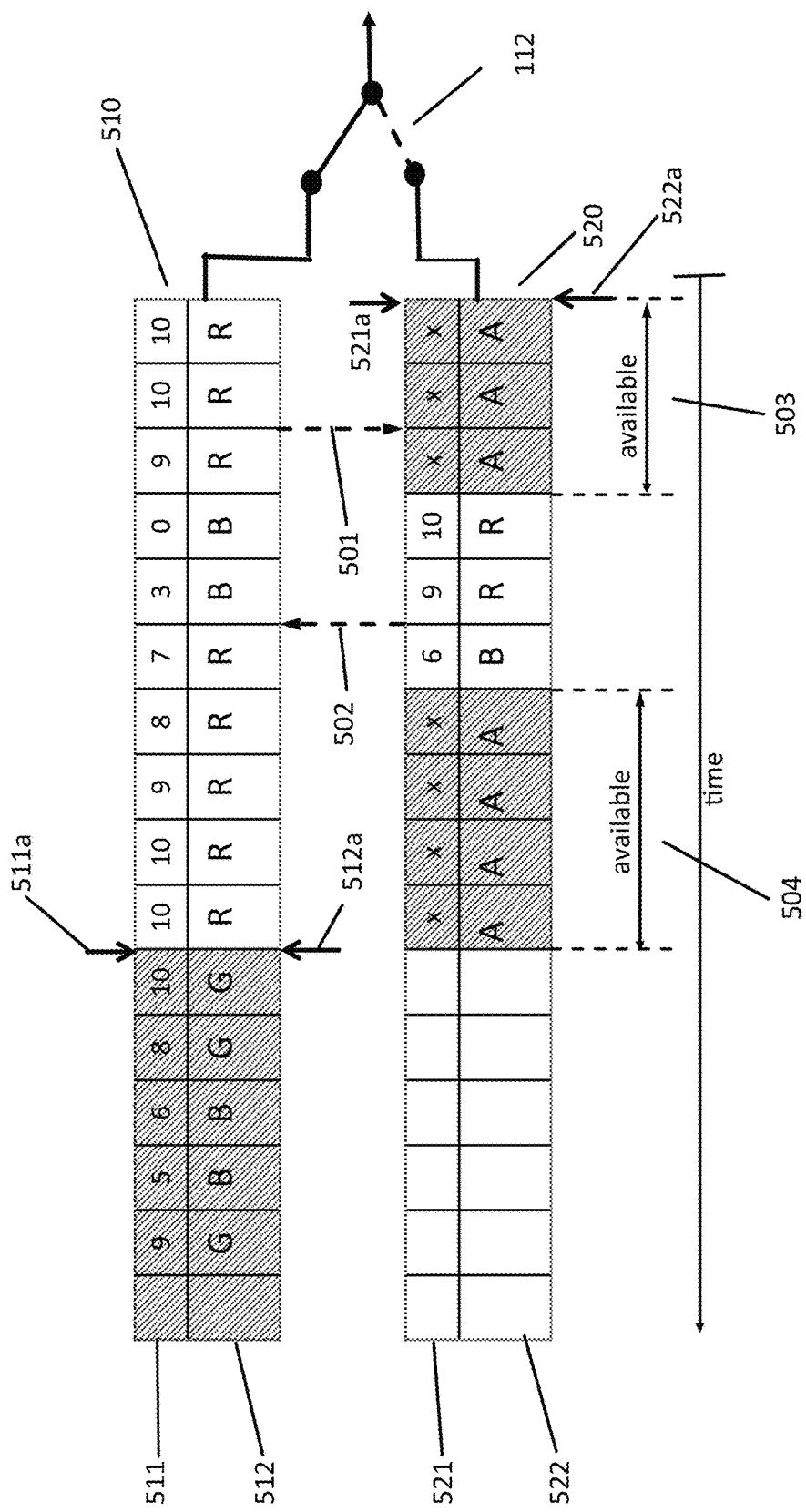
FIG. 5 shows a further example of a selection method.

FIG. 4b is a flow diagram depicting method steps that may be associated with the output selection as shown in FIG. 4a. At step 410 of FIG. 4b, a plurality of data streams carrying common content are received. Each of the data streams may be received from a respective receive path and may be stored in a respective buffer. The data streams may be made up of data blocks and the data blocks may be stored in the respective buffer as they arrive. Each data block may be stored in the buffer along with quality information associated with that data block. The quality information may for example correspond to a quality experience by a receive path (on which that data block is received) at the time of reception of the data block.

At step 430, buffered data blocks are selected to be output and/or rendered. At the time of step 420 a plurality of buffers each store a one or more data blocks and their associated quality information. The packet streams may carry common content and at least some of the data blocks may carry corresponding content. In order to output an output packet stream carrying the common content, a plurality of data blocks may be selected to be output from selected buffers and multiplexed together to form the output packet stream.

Because the output packet stream is delayed with respect to at least one of the buffers, the selection of which blocks to output for a portion of the output packet stream may be known in advance. For example a number of data blocks corresponding to the next blocks of common content to be output for the output packet stream may be buffered in one or more of the buffers. If these number of data blocks are determined to be of sufficient quality in dependence on their associated quality information, then these blocks may be selected to be output. In this case, if none of these selected data blocks are in one of the buffers, then that buffer is not used for the duration of that number of data blocks being output on the output packet stream. In this case, the receive path of the unused buffer may be used for another purpose.

At step 440 a determination is made whether a buffer will be unused to output the next number of data blocks. This determination may be based on whether the next number of data blocks selected to be output are already present in other buffers. If the determination is no, the method returns to step 430 where data blocks are continued to be buffered and selection made. If it is determined that a buffer will be unused, then the method proceeds to step 450 where a receiver associated with that unused buffer or receive path is used for another purpose or application.

Figure 6:
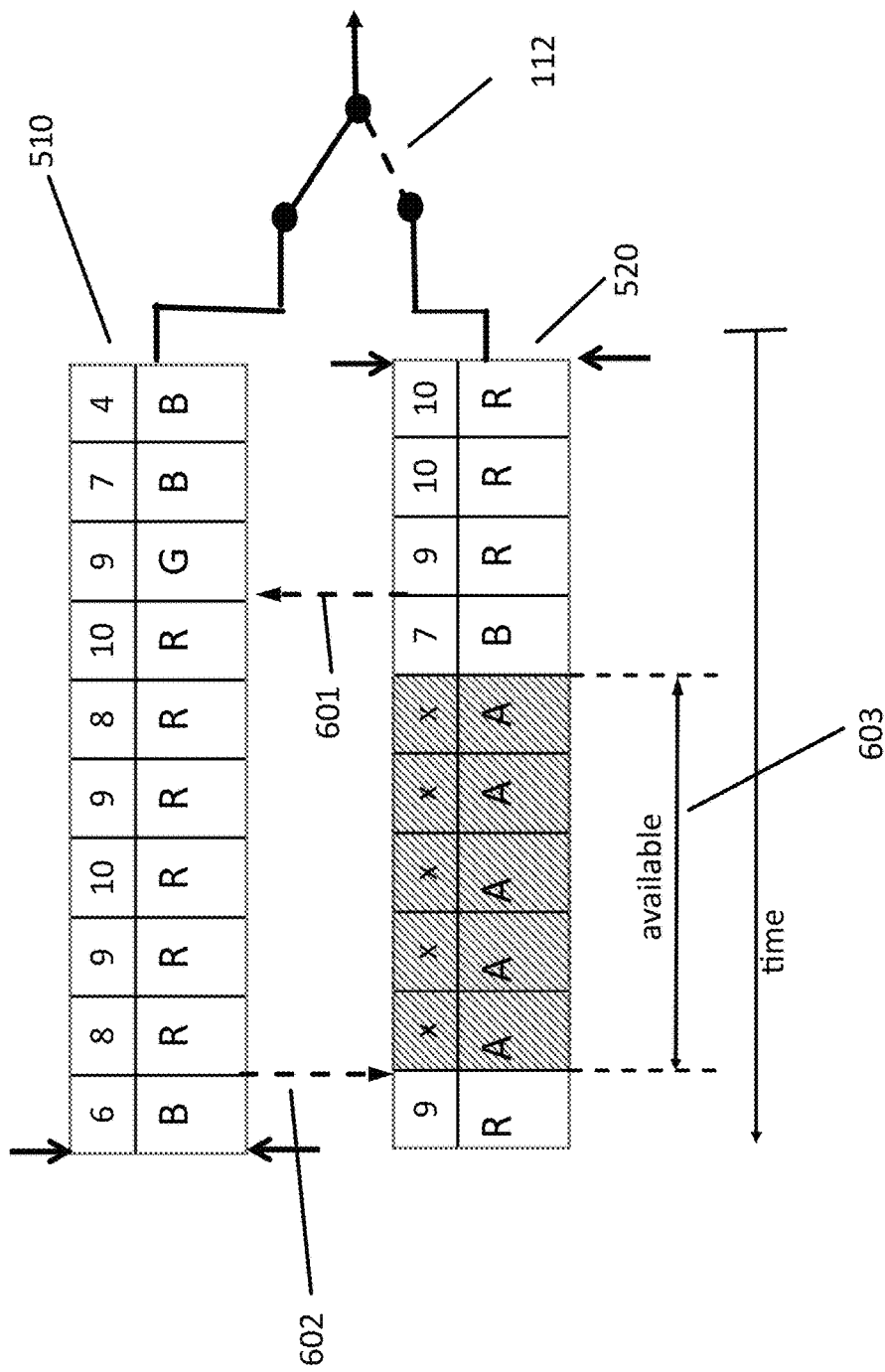
FIG. 6 shows another further example of a selection method.

FIGS. 5 and 6 provide two specific examples of a receive path being used for other purposed when not selected. In the example of FIG. 5, the receive path that is receiving data ahead of at least one other receive path is selected as output. In other words, the path with more buffered data. Selecting this path allows the system to 'look-ahead' as more data is available in the buffer for that path. However, in some examples, the receive path that is behind at least one other path (having less buffered data than the other path) may be selected based on the quality of the available data blocks. This example is shown in FIG. 6, where the receiver that is receiving data behind at least one other receive path is selected as output.

FIG. 5 shows an example of a delay buffer having a first delay buffer 510 and a second delay buffer 520. An output of each of the delay buffers 510 and 520 is coupled to a selection mechanism 112. Each of the delay buffers comprising a quality buffer portion 511, 521 and a data buffer portion 512, 522. Each of the delay buffers 510, 520 is associated with a receive path. The quality buffer portions 511, 521 have respective write pointers 511a, 521a pointing to the next position in the quality buffer portion 511a, 521a to which to incoming quality information or parameters of the respective receive path are to be written. The data buffer portions 512, 522 have respective write pointers 521a, 522a pointing to a next position in the data buffer portion 521, 522 to which incoming data blocks are to be written. For each buffer, the quality buffer portion write pointer and data buffer portion write portion are synchronized.

The data streams received by a first receive path associated with the first buffer 510 and the receive path associated with the second buffer 520 may be misaligned. In other words, while the first and second receive paths receive corresponding content or data, this content or data is offset with respect to time between the two receive paths. The first receive path receives data ahead of the second receive path. This corresponds to a transmit or other processing delay being larger for the second receive path than for the first receive path. The first buffer 510 may start receiving data blocks before the second buffer 520 and buffers or delays these data blocks in order to realign the content in the data streams received by the first and second buffers 510, 520.

In the example of FIG. 5, the first buffer 510 has received and stored a first to tenth data block and the second buffer 520 has not yet received a first data block. The delay between the first and second receive paths may thus be considered to be the time taken to receive ten data blocks. The switching mechanism may determine when the output of the first buffer 510 will be selected in dependent on the buffered data blocks and the corresponding quality information in the quality buffer portion of the first buffer 510. The first to third data blocks and the sixth to tenth data blocks in the first buffer 510 are determined to be of sufficient quality in dependence on their associated quality information in the quality buffer portion. It may be predetermined that for the first to third and sixth to tenth data blocks of the content, the first buffer 510 will be coupled to the output. This is shown by these data blocks being marked 'R' for rendered in the figure.

The fourth and fifth data blocks received by the first buffer 510 are determined to be of insufficient quality in dependence on the quality information in the first quality buffer portion and it is determined that the first buffer 510 will not be coupled to output the fourth and fifth blocks. Thus, the fourth and fifth blocks may be required to be output from the second buffer 520. In this example, the first buffer 510 is initially selected, however the selection may change from the first buffer 510 to the second buffer 520 for the outputting of the fourth and fifth data blocks. This is shown at 501. The quality of the sixth to tenth blocks of the first buffer 510 are of sufficient quality to output and the selection changes from the second buffer 520 to the first buffer 510 at 502.

Due to the buffered data in the first buffer 510, it can be known that the second buffer 520 will not be selected to output the first to third and sixth to tenth data blocks, but may be required to output the fourth and fifth data blocks. The second buffer 520 and second receive path may be determined to be available to perform other functions during the time in which the first to third data blocks are output at 503 and the time in which the sixth to tenth data blocks are output.

In this example, the first delay buffer 510 (buffer associated with the shortest path delay and hence largest number of buffered data blocks) may be selected as the default output with the second data buffer 520 being selected only when the data blocks in the first data buffer are of insufficient quality to be output or rendered. The receive path that buffers the least data (the path with the greatest delay in receiving the content) may be used for alternative functions when it is not selected as output.

FIG. 6 shows a second example of the alternative use of a receive path buffering less data than at least one other receive path. In a case where the second receive path (the path that receives data behind) is experiencing average better receive quality than the first receive path (the path that receives data ahead), the second receive path may still be used for alternative functions by switching between the paths where possible.

In one example, the first buffer 510 may be set as the default buffer (even though it has lower average quality) and a switch may be made from the first buffer 510 to the second buffer 520 whenever data blocks of insufficient quality are available in the first buffer 510. This option may attempt to keep the second receive path available wherever possible, however it may lead to excessive switching between the two paths.

FIG. 6 shows an example of switching algorithm that balances the used of the second receive path for alternative functions with the amount of switching. This may be implemented in the case where the average quality of the second receive path is better than the first.

In FIG. 6, the second data buffer 520 (having better average quality) is selected as the default output buffer and a switch is made to the first buffer 510 whenever it is determined that a predetermined number of data blocks of sufficient quality are available in the first buffer 510. This predetermined number may be the minimum number of data blocks for which the second buffer 520 needs to be available in order to perform an alternative function.

In FIG. 6, the second buffer 520 is selected as the default output buffer. The first to third data blocks in the second buffer 520 are of sufficient quality to be output and so are selected for rendering. The selection mechanism identifies that the fourth to ninth data blocks of the first delay buffer 510 are of sufficient quality and can be selected for output. A switch from the second buffer to the first buffer is made at 601 for these 6 blocks.

It will be appreciated that in this case, the first to tenth data blocks may have be received and stored in the first buffer 510 however these blocks have not yet been received by the second buffer 520. The second buffer may thus be selected as the default output and a switch may be made when a predetermined number of data blocks of sufficient quality are available in the first buffer 510. At the end of the predetermined number, a switch 602 is made back to the second buffer 520. During the time period 603 that the fourth to ninth blocks are output from the first buffer 510, the second receive path may be used for alternative functions.

In FIGS. 5 and 6, only two receive paths are shown. It will however be appreciated that in other embodiments there may be a plurality of receive paths and data blocks may be selected from one or more of these paths.

In the foregoing receive paths corresponding to broadcast standards such as FM, DAB and internet broadcast have been referred to. It will however be appreciated that the receive paths may adhere to any particular standard and two or more of the paths may in some examples, adhere to the same standard.

The invention claimed is:

1. An apparatus comprising:
   an input for receiving a plurality of data streams carrying misaligned common content;
   a plurality of buffers configured to delay one or more of the data streams to align the common content, each buffer for storing data blocks of a respective one of the plurality of data streams; and
   an output for selecting a data block from the plurality of buffers to form a next data block in an output packet stream comprising the common content;
   wherein each data block is stored in a respective buffer along with quality information corresponding to said data block and selecting a data block from the plurality of buffers is carried out in dependence on the quality information.

2. The apparatus of claim 1, wherein the quality information corresponding to each data block corresponds to a quality experienced by a receive path at the time of reception of each data block.

3. The apparatus of claim 1, each respective buffer comprises a data buffer portion for storing a plurality of data blocks of a respective data stream and an associated quality buffer portion for storing the quality information corresponding to each of the plurality of data blocks.

4. The apparatus of claim 1, wherein the output is further configured to select a number of data blocks from the plurality of buffers to form the number of next data blocks in the output packet stream.

5. The apparatus of claim 4, further configured to determine whether any of the next data blocks are selected from a first buffer of the plurality of buffers and, if not, using a receive path associated with that first buffer for another application.

6. The apparatus of claim 5, wherein using the receive path associated with the first buffer for another application further comprises detuning a receiver of the receive path from the first data stream.

7. The apparatus of claim 4, wherein the output is further configured to select a data block from the plurality of buffers if the quality information corresponding to that data block indicates that the data block is of sufficient quality to be rendered to the output.

8. The apparatus of claim 4, wherein the output is configured to prioritise selecting buffered data blocks from a delay buffer corresponding to a data stream that is subject to less delay over selecting buffered data blocks from a delay buffer corresponding to a data stream that is subject to more delay.

9. The apparatus of claim 8, wherein the delay is at least one of a transmit path and processing delay.

10. The apparatus of claim 1, wherein the output is configured to:
    select one of the plurality of data streams to be a default data stream; and
    select one or more first data blocks from a first delay buffer associated with the default data stream when the quality information associated with the first data blocks indicate that the first data blocks are of sufficient quality to be rendered;
    select one or more second data blocks from a second delay buffer associated with a further one of the plurality of data streams when the quality information associated with the second data blocks indicate that second data blocks are of sufficient quality to be rendered and quality information associated with third data blocks in the first delay buffer indicate that the third data blocks are of insufficient quality to be rendered, wherein the common content in the second and third data blocks correspond; and when a number of successive data blocks are selected from one of the first delay buffer and the second delay buffer, make a receive path associated with the other of the first delay buffer and the second delay buffer available to another application.

11. The apparatus of claim 10, wherein the default data stream is selected as being associated with higher average quality information than that of the further one of the plurality of data streams.

12. The apparatus of claim 1, wherein each buffer is a first in first out FIFO and read pointers for each of the buffers are synchronised.

13. A method comprising:

receiving a plurality of data streams carrying misaligned common content;

delaying one or more of the data streams to align the common content by storing the plurality of data streams in a plurality of buffers, each buffer storing data blocks of a respective one of the plurality of data streams; and forming an output packet stream comprising the common content by selecting a data block from the plurality of buffers to form a next data block in the output packet stream;

wherein the step of each buffer storing data blocks of a respective one of the plurality of data streams further comprises storing quality information corresponding to each data block and selecting a data block from the plurality of buffers is carried out in dependence on the corresponding quality information.

14. The method of claim 13, wherein the quality information corresponding to each data block corresponds to a quality experienced by a receive path at the time of reception of each data block.

15. The method of claim 13, wherein forming the output stream comprising the common content further comprises:

selecting one of the plurality of data streams to be a default data stream; and selecting one or more first data blocks from a first delay buffer associated with the default data stream when the quality information associated with the first data blocks indicate that the first data blocks are of sufficient quality to be rendered;

selecting one or more second data blocks from a second delay buffer associated with a further one of the plurality of data streams when the quality information associated with the second data blocks indicate that second data blocks are of sufficient quality to be rendered and quality information associated with third data blocks in the first delay buffer indicate that the third data blocks are of insufficient quality to be rendered, wherein the common content in the second and third data blocks correspond; and when a number of successive data blocks are selected from one of the first delay buffer and the second delay buffer, make a receive path associated with the other of the first delay buffer and the second delay buffer available to another application.

* * * * *